(12) United States Patent
Kientz et al.

(10) Patent No.: US 6,309,584 B1
(45) Date of Patent: Oct. 30, 2001

(54) METHOD FOR PRODUCING PROFILED SECTIONS COATED WITH LUBRICATING LACQUER FOR USE IN THE BUILDING INDUSTRY, AND PROFILED SECTION COATED WITH THE LUBRICATING LACQUER

(75) Inventors: Paul Kientz, Wadern; Werner Berens, Farschweiler, both of (DE)

(73) Assignee: Saar-Gummiwerk GmbH, Wadern (DE)

( * ) Notice: Subject to any disclaimer, the term of this patent is extended or adjusted under 35 U.S.C. 154(b) by 0 days.

(21) Appl. No.: 09/171,555

(22) PCT Filed: Feb. 12, 1998

(86) PCT No.: PCT/DE98/00397

§ 371 Date: Nov. 19, 1998

§ 102(e) Date: Nov. 19, 1998

(87) PCT Pub. No.: WO98/36851

PCT Pub. Date: Aug. 27, 1998

(30) Foreign Application Priority Data

Feb. 21, 1997 (DE) .............................................. 197 06 804

(51) Int. Cl.$^7$ .................................................. B29C 35/08
(52) U.S. Cl. .......................... 264/477; 264/464; 264/129; 156/277; 156/384; 156/390; 156/538
(58) Field of Search .............................. 428/195; 264/464, 264/477, 643, 129, 132; 156/277, 134, 379.6, 384, 387, 390, 538

(56) References Cited

FOREIGN PATENT DOCUMENTS

56144143 * 11/1981 (JP).
61111176 * 5/1985 (JP).

OTHER PUBLICATIONS

Patent Abstracts of Japan, Vo. 006, No. 026 (M–112), Feb. 16, 1982, JP 56 144143 A (Yokohama Rubber Co. Ltd.), Nov. 19, 1981.
Database WPI, Section Ch, Week 8628, Derwent Publications Ltd., London, G.B., AN 86–178844, XP002072785, JP 61 111 176 A (Takemasa K).

* cited by examiner

Primary Examiner—Merrick Dixon
(74) Attorney, Agent, or Firm—James Creighton Wray; Meera P. Narasimhan

(57) ABSTRACT

Profiled sections 1, in particular extruded seals made of elastic material, are designed and produced economically such that they have absolute storage stability and low coefficients of friction and are suitable for a wide variety of uses. The profiled sections 1 are made of a non-lacquer-repelling material. After leaving the extruder 12 and before entering the fused salt bath 16 the profiled sections are coated with a lubricating lacquer 7 applied to the uncured surface 5. The lubricating lacquer 7 is then cured in the fused salt bath 16 without there being a need for a separate curing section or similar. This method not only evenly coats the profiled sections with lubricating lacquer 7 but also prevents the formation of air bubbles or the like, thereby yielding a consistently even coating 6.

16 Claims, 1 Drawing Sheet

METHOD FOR PRODUCING PROFILED SECTIONS COATED WITH LUBRICATING LACQUER FOR USE IN THE BUILDING INDUSTRY, AND PROFILED SECTION COATED WITH THE LUBRICATING LACQUER

BACKGROUND OF THE INVENTION

The invention affects a procedure for producing profiled sections out of elastic material that will be further processed, particularly profiled joints for the construction industry, which are extruded and then cured in fused salt at 170–330° C., and onto which the necessary data is printed as well as a coating is applied—and then dried—which favors the installation process. Furthermore the invention concerns a piece of equipment to produce profiled sections coated with lubricating lacquer for the construction industry with an extruder, a fused salt bath and a coating and printing station. Finally, the invention affects a profiled section, especially a profiled window section for the building industry with a profile rail and a sealant body whose surface is equipped with a coating that facilitates installation.

Profiled sections out of crude rubber, resin, or appropriate blends are required for a wide range of applications, among other things in the building industry for windows where they are used both for the installation of panes into the actual profiled section and for an all-around sealant between the movable window wing and the profiled section frame. The profiled sections are extruded and then cured in a fused salt bath in order to be further treated afterwards, especially to be imprinted and equipped with a coating that favors installation and further processing. The coatings used for such profiled sections until now were silicone emulsions, which are meant to make the actual profiled window section more pliable and altogether easier to handle. The disadvantages in these silicone emulsion coatings, however, are that these emulsions have only limited storage stability, that changes during the manufacturing process are practically impossible so that customer requests cannot be incorporated or only at appropriately high expenses, and above all that the utilization of silicone emulsions leads to a contamination of the production equipment and also of people during the handling process of the silicone-treated profiled sections. Not only the processing station operator has to deal with the occurring contamination, but also subsequent operators or handlers because the silicone emulsion smudges everything unfavorably. Even the housewife is often still affected in her cleaning duties for months to come by silicone emulsion residues.

SUMMARY OF THE INVENTION

The invention is therefore based on the task of creating a procedure and a piece of equipment for the economical production of profiled sections, especially of profiled window sections, with a coating that allows simple and clean processing and ensures long storage stability. In addition, an appropriate profiled section is to be created.

With the invention the task is resolved by manufacturing the profiled sections out of a non-lacquer-repelling material and by coating them after leaving the extruder and before entering the fused salt bath with a lubricating lacquer applied onto the uncured surface.

Such lubricating lacquer coatings are basically known from the automotive industry, where the profiled sections are first extruded and cured and then treated, i.e., equipped with the lubricating lacquer instead of the silicone emulsion. The lubricating lacquer must subsequently be hardened through appropriate equipment, which necessitates not only considerable additional investments, but also requires a lot of space and time because the hardening of the lacquer must be done very carefully and over the entire surface of the profiled section body. In contrast, in the procedure invented the lubricating lacquer is applied to the uncured profiled section and then inserted into the fused salt bath where, surprisingly, full hardening of the lubricating lacquer occurs, without the lubricating lacquer being affected by the fused salt bath as such. After the part has left the fused salt bath, you have a profiled section that can be used without problems. A profiled section developed in such a way offers considerable advantages. At first, the dry surface should be mentioned as well as the low friction coefficient. At considerably improved storage stability values, simple and clean handling is possible, with the lubrication effect being maintained permanently because contrary to the profiled sections coated with silicone emulsions the lubricating lacquer is maintained on the profiled section's surface. The profiled section's surface interlocks with the lubricating lacquer, leading to an appropriately long service life. The fixation of the lubricating lacquer onto the profiled section's surface eliminates the existing extensive work involved with the cleaning of the windows, not only during the initial cleaning, but also for subsequent cleaning processes. Another advantage is the fact that the lacquer work is in no way affected by the lubricating lacquer that is applied to the profiled section. This creates an overall procedure which offers considerable advantages for the profiled section that is produced, but beyond also for the manufacturing process itself because a separate lubricating lacquer hardening step can be foregone since the lacquer already undergoes this process in the fused salt bath. Hardening in the fused salt bath also ensures uniform hardening of the lubricating lacquer around the surface of the profiled section, even if this surface is not completely even due to the profiled section's layout, but has cuts and similar gaps.

An effective development of the invention plans for the distance between coating station and the fused salt bath to be sufficiently large to enable volatile matters to escape. This layout of the procedure offers the opportunity to use a lubricating lacquer that has been manufactured on a PU, silicone or teflon compound-basis, their derivatives, modifications or blends with solvents. By allowing the volatile matters to escape before immersion into the fused salt bath, optimized hardening in the fused salt bath itself is enabled. In doing so we found that a distance of 0.25–3 m, preferably a length of 1 m, is sufficient to ensure that the volatile matter escapes.

Another effective development plans for the lubricating lacquer to be sprayed, painted or otherwise spread onto certain parts or the entire surface of the profiled section. This shows that the lubricating lacquer, which should have a layer thickness of 3–4 $\mu$ in order to ensure the necessary storage stability and appropriate service life after assembly of the entire profiled section, can be applied by using different techniques. The application technique will allow to coat only partial areas of the profiled section with lubricating lacquer or the entire surface, which then offers also the possibility to pull the profiled section through a lubricating lacquer bath or immerse the section in it.

If sufficient hardening of the lubricating lacquer is not ensured by the fused salt bath for technical reasons, then the profiled section can be treated with hot air, IR or UHF, after the coating process and before entering the fused salt bath and/or after leaving the fused salt bath, according to an appropriate version of the invention. In detail, this is a preor post-treatment process of the profiled section; however, generally the fused salt bath hardening process described above is sufficient and can often even be broken off early if the curing process permits. It is surprising that the curing process is not affected negatively by the lacquer layer that is applied; however, the layer thickness is important for this and should be at 3–4 $\mu$, as described in the above version.

For identification purposes, the profiled section must be equipped with various types of information. A familiar process includes the printing of appropriate notices and data onto the profiled section. In doing so, the identification features must remain on it at least until assembly. In accordance with one version of the invention, imprinting the profiled section before the coating process ensures this. This offers the great advantage that then the identification features are located below the protective lubricating lacquer layer and are still visible. They cannot be wiped off accidentally or removed otherwise. This provides clear advantages for both the manufacturer and the customer in the case of quality problems.

A simple and variable version of the procedure includes the printing of the profiled section with an ink jet printer because this way customer requests can be met not only with regard to the profiled section and the coating, but also with regard to the desired information.

In the automotive industry, where lubricating lacquer-coated profiled sections are already known as described above, the usage of solvents has proven to be disadvantageous and can represent a hindrance during the processes described below. With the invention, utilizing water-based systems as the lubricating lacquer prevents this. These solvent-free systems can be processed without problems and cannot lead to any changes, neither on the profiled section nor on parts or window systems equipped with the profiled sections.

It is beneficial if the applied coating, i.e., the lubricating lacquer, is enriched with color particles, both to simplify assembly and to adjust to the respective application area. Such colored lubricating lacquers allow defined lacquering of the profiled sections, which as described, offers advantages both during assembly and for future applications. Accordingly, the surface areas are coated with lubricating lacquer of different colors without affecting the window cleaning process or other work negatively afterwards. Purely theoretically speaking, it would even be possible to apply other lubricating lacquers or similar systems to the colored lubricating lacquer areas later on.

A piece of equipment, which includes an extruder, a fused salt bath, and a coating and printing station, serves to execute the procedure. Even and safe hardening as well as inexpensive hardening of the applied lubricating lacquer is ensured by arranging the coating station between the extruder and the fused salt bath at a certain distance to the salt tub. By ensuring the appropriate distance to the salt tub, solvent-containing lubricating lacquers, whose volatile matters escape in time before entry into the fused salt bath, can be used as well. Blistering and other problems can then no longer occur. Blistering is of course prevented when solvent-free systems are utilized; however, even then the distance to the salt tub is advantageous because a certain degree of hardening on the part of the lubricating lacquer at room temperature will already have occurred. A particular advantage of this piece of equipment is the fact that subsequent, extensive hardening stations can be completely eliminated and that there is the possibility of combining the coating and printing stations, as will be explained below.

Data and information applied onto the profiled section via the printing station are not influenced at all by subsequent processing stations and are there to stay even after completion of the profiled section if the printing station is located before the coating station, as is being suggested in the invention. The printing station imprints the profiled section still in its uncured state, with the subsequent coating process covering and protecting the print and preserving it permanently because the lubricating lacquer systems that are utilized guarantee the visibility of the printing information that is applied.

One particularly simple and also inexpensive version of the printing station includes a PC-controlled ink jet printer. This version offers the additional advantage that customer requests can be adjusted to without problems because even changes to the printed information can be carried out via the PC. This way, practically each individual piece of printed information can differ from the subsequent and the previous one.

One version of the coating station that guarantees a particularly beneficial and even coating plans for the station to be a spray loop, brush or immersion bath. The spray loop offers the possibility to ensure coating of the profiled section even if it is guided through at high speed. Furthermore, practically any coating thickness can be programmed and met so that high-quality profiled sections can be produced.

Earlier we pointed out that the hardening of lubricating lacquers occurs in the fused salt bath in a surprisingly simple and safe manner as well as offers relatively even coating of the entire profiled section. Should problems arise, for whatever reason, or should the section be subject to particularly strict quality demands, it is possible to incorporate an additional hardening process to the salt bath in the form of hot air, IR or UHF, either in front of it or behind it.

The profiled section manufactured with this procedure in the production equipment described has already been explained above in detail. For this reason we would like to reference that description and note, as an annotation and further explanation, that profiled sections of different shapes, especially those for the construction industry, are equipped with a coating that facilitates assembly. The coating consists of a lubricating lacquer applied to the uncured profiled section body; the lacquer is hardened in the fused salt bath at 170–330° C. Although such lubricating lacquers are basically known already, they have not been applied in the manner in which they are described herein and for appropriate profiled sections because their exact applications had been considered difficult or impossible. In particular, we found out that a lubricating lacquer can be applied to the cured profiled section body only through special treatment methods, i.e., especially with regard to the hardening process. The positive characteristics and service life of the profiled section produced in accordance with the invention are also created, in particular, by applying lubricating lacquer to the uncured profiled section body where it can "hold on". In the subsequent fused salt bath, it is then hardened without additional system and production expenses in an overall safe manner, which results in the favorable properties and advantages that are described above.

A coating that is sufficient for assembly and also does not affect the curing process negatively should have a layer thickness of 2–5 $\mu$, preferably 3–4$\mu$. As was already mentioned, the lubricating lacquer couples well with the profiled section surface so that a high service life and permanent lubricating coverage is achieved despite the low layer thickness.

For merely aesthetic reasons, but also to simplify assembly, it could be beneficial if the coating were colored. Profiled sections treated this way can be advantageous, for example, with regard to window installation, if the colored coating so-to-speak represents integration with the allocated profiled section. For this, the coating is applied partially to specified profiled section geometries in order to optimize especially also assembly.

Due to the distance described between the coating station and the fused salt bath or salt tub, blistering is eliminated even in the case of solvent-containing lubricating lacquers. This is especially true when the lubricating lacquer that forms the coating is solvent-free. Furthermore, the utilization of such lubricating lacquers is environmentally friendly and does not require separate (suction) removal and similar measures.

The invention excels particularly due to the fact that a low friction coefficient of the surface is guaranteed when using the procedure, the equipment and appropriately manufactured profiled section. The surface is always dry, and good handling—without the danger of any contamination—is guaranteed. The long storage stability and permanent lubricating affect generated by the lubricating lacquer practically forming a unity with the surface of the profiled section should be pointed out. A similar appearance of co-extruded or tri-extruded profiled sections at various mixtures of the original product offers advantages both with regard to usage and sales. Process-safe applications are possible, and beyond that the lubricating lacquer can be applied partially to various profiled section geometries in either transparent or colored versions, with the imprinted information beneath remaining visible even in the case of colored lubricating lacquers. Finally, it is beneficial that the cleaning process of windows is no longer hindered by silicone or coating residues, but rather can be conducted easily and without problems. Even when wiping the actual profiled section with a wet cloth or similar cleaning instrument the profiled section is not harmed, and the actual profiled section remains unaltered by such moisture because the lubricating lacquer seals it at the same time. If the window is painted, after first being installed or later on, negative effects on the lacquering work is not be expected because there are no smudge residues from the coating. As mentioned before, the lubricating lacquer rather adheres to the profiled section. Another beneficial effect is that the hardening of the lubricating lacquer, which is applied through spraying, with a brush, through immersion or similar measures, occurs so evenly by going through the subsequent fused salt bath that neither blisters nor uneven hardening areas are created and that therefore a consistent lubricating and protective effect is guaranteed through such a coating process. Regarding the environmentally friendly aspect, we would like to point out that such a procedure can also be conducted with solvent-free lubricating lacquers which are especially environmentally beneficial but can, at the same time, be hardened in the fused salt bath without problems due to the lacking solvent.

Further details and advantages of the invention topic result from the following description of the appropriate drawing that depicts a preferred version with the necessary details and parts. It shows:

DETAILED DESCRIPTION OF THE PREFERRED EMBODIMENT

Figure 1:
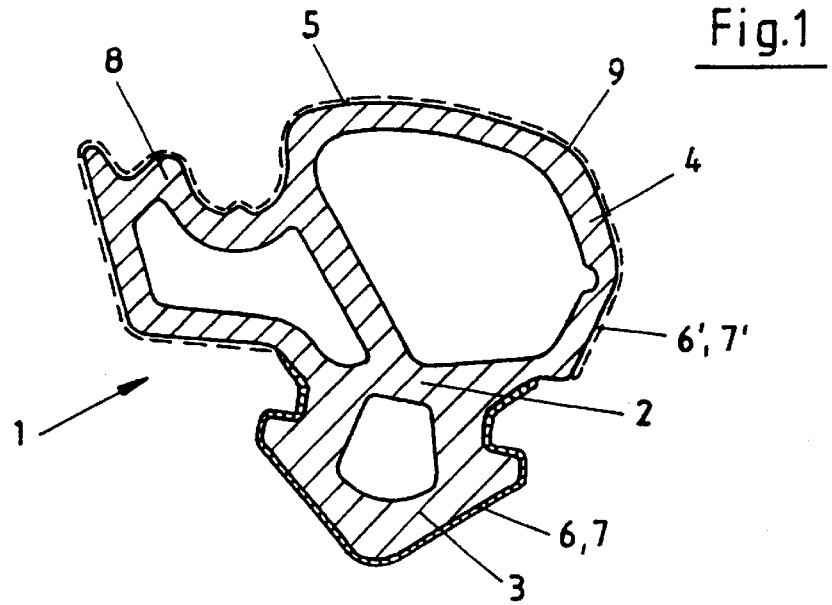
FIG. 1 profile cross-section.

The profiled section shown in FIG. 1 is an elastic profiled joint 1 to seal windows and similar closures; its fastening wedge or profiled section rail 3 can be inserted into the groove of the profiled resin section. The accordingly arched sealant lip 9 rests against the frame or the windowpane and seals it; the sealant bead 8 has a lug at the end. These parts of the sealant profiled in section 1 consist of a thermoplastic resin. Shortly before the extrusion process, they are to be connected with a semi-finished lock or the window at the moment of production. Even in the case of such a layout it is necessary that the appropriate profiled section 1 is pressed into the groove (not shown here) for which the profiled section rail 3 of the profiled section body 2 must be bent accordingly. This bending and pressing process is considerably facilitated by the fact that the profiled section rail 3 in this area of the surface 5 of the sealant body 4 is equipped with a coating 6. This coating 6 is a lubricating lacquer 7 that is applied either only in this area, i.e., in the area of the profiled section rail 3, or over the entire surface as indicated by reference notes 6' and 7'. The sealant bead 8 and the sealant lip 9 are then also covered with an appropriate coating 6 in the form of the lubricating lacquer 7 so that they do not only maintain a dry surface 5, but also have a low friction coefficient, which is important for further handling. Furthermore, the crude rubber material cannot be scraped off, nor can the appropriate sealant start leaking due to grooves or similar.

Figure 2:
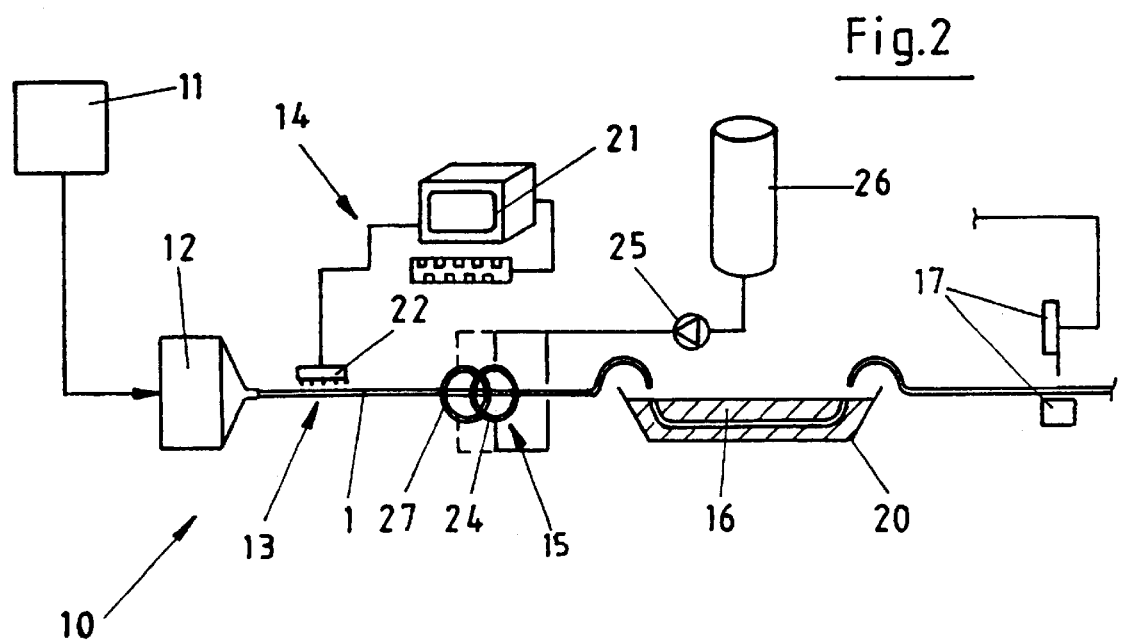
FIG. 2 sketch of production equipment.

The actual profiled section 1 or the profiled section body 2 can of course also have different shapes, with the profiled section body 2 being specified by the shape of the extruder 12, as indicated in FIG. 2. In this production equipment 10, the crude rubber or other original product is kept in a silo 11 and fed to the extruder 12 from there. Between the extruder 12 and the necessary curing process in the fused salt bath 16 a processing stretch 13 is planned which comprises the printing station 14 and the coating station 15.

In the production equipment 10, shown in the sketch of FIG. 2, the profiled section 1 receives the necessary identification features, i.e., letters and numbers, from the ink jet printer 22, which is controlled by a PC 21, after leaving the extruder 12 and before entering into the salt tub 20. The ink jet printer 22 and the PC 21 offer the possibility of changing the respective identification features very quickly, at short notice and extensively so that customer requests can be incorporated here without problems.

After having been imprinted by the ink jet printer 22, the profiled section 1 is guided through a spraying loop 24, which here represents the coating station 15. In the spraying loop or via the spraying loop, a lubricating lacquer is sprayed onto the profiled section 1 from the lacquer tank 26 via the pump 25 in a specified layer thickness.

As lubricating lacquer, e.g. PU, silicone or teflon compounds, their derivatives, modifications or blends, can be used with the according solvents. An appropriate layout of the treatment stretch 13, or its appropriate length, ensures that essential parts of this solvent have already escaped before the profiled section 1 is immersed into the fused salt bath 16 in the salt tub 20.

It is indicated in FIG. 2 that the profiled section 1 passes through the fused salt bath 16 and is then guided into a cutting station 17, where the profiled section 1 is cut to its respective size. When leaving the fused salt bath 16, the lubricating lacquer is already hardened, independent of the fact whether it contained solvents or was solvent-free. Blistering does not occur, and sizing in the cutting station 17 is possible without problems so that after that the individual profiled sections are available for further processing. Of course it is also possible to wind the profiled section's appropriate length onto spools and then send them to the customer.

FIG. 2 further clarifies that there is the possibility of arranging several spraying loops 24, 27 one behind the other, in order to either apply two coatings onto the profiled section or to equip different areas of the profiled section with different colored coatings 6.

All features stated, also those only mentioned in the drawings, are regarded as critical parts of the invention, by themselves and in combination with each other.

What is claimed is:

1. Procedure for producing profiled sections, that can be further processed, out of elastic material, particularly profiled joints for the construction industry, which are extruded and then cured in fused salt at 170–330° C., and onto which the necessary data is printed as well as a coating is applied and then dried, characterized by the fact that the profiled section is produced out of non-lacquer-repellent material and coated with a lubricating lacquer applied to the uncured surface after leaving the extruder and before entering the fused salt bath.

2. Procedure according to claim 1, characterized by the fact that the distance between the coating process and the fused salt bath is long enough to enable the volatile matters to escape.

3. Procedure according to claim 2, characterized by the fact that the distance measures 0.25–3 m, preferably 1 m.

4. Procedure according to claim 1, characterized by the fact that the lubricating lacquer is sprayed, painted or spread onto certain areas or the entire surface of the profiled section.

5. Procedure according to the claim 1, characterized by the fact that the profiled section is pulled through a lubricating lacquer bath or immersed in it.

6. Procedure according to claim 1, characterized by the fact that the profiled section is treated with hot air, IR or UHF, after the coating process and before entering the fused salt bath and/or after leaving the fused salt bath.

7. Procedure according to claim 1, characterized by the fact that the profiled section is imprinted before coating.

8. Procedure according to claim 7, characterized by the fact that the profiled section is imprinted with an ink jet printer.

9. Procedure according to claim 1, characterized by the fact that water-based systems can be utilized as the lubricating lacquer.

10. Procedure according to claim 1, characterized by the fact that the applied coating, i.e. the lubricating lacquer, is enriched with color particles.

11. Procedures according to claim 1, characterized by the fact that partial surface areas are coated with different colored lubricating lacquers.

12. Equipment for the production of profiled sectioned coated with lubricating lacquer for the building industry and therefore for the execution of the procedure according to claim 1 through, with an extruder (12), fused salt bath (16) and a coating (15) and printing station (14), characterized by the fact that the coating station (15) is arranged between the extruder (12) and the fused salt bath (16) at a distance to the salt tub (20).

13. Equipment according to claim 12, characterized by the fact that the printing station (14) is located before the coating station (15).

14. Equipment according to claim 13, characterized by the fact that the printing station (14) is equipped with an ink jet printer (22) controlled via a PC (21).

15. Equipment according to claim 12, characterized by the fact that the coating station (15) is laid out as a spraying loop (24), brush or immersion bath.

16. Equipment according to claim 12, characterized by the fact that an additional process involving hot air, IR or UHF, is located before and/or after the fused salt bath (16).

* * * * *